United States Patent [19]

Knowlton

[11] Patent Number: 5,517,586
[45] Date of Patent: May 14, 1996

[54] METHOD AND APPARATUS FOR AUTOMATICALLY SPECIFYING A PORTION OF TEXT FROM A BITMAP IMAGE OF THE TEXT

[75] Inventor: Kenneth C. Knowlton, Merrimack, N.H.

[73] Assignee: Wang Laboratories, Inc., Billerica, Mass.

[21] Appl. No.: 291,262

[22] Filed: Aug. 16, 1994

[51] Int. Cl.$^6$ .............................. G06K 9/34; G06K 9/46; G06K 9/20

[52] U.S. Cl. ........................ 382/292; 382/171; 382/177; 382/290

[58] Field of Search .................................. 382/9, 18, 22, 382/23, 170, 171, 177, 176, 232, 289, 290, 292; 395/146, 150; 345/145

[56] References Cited

U.S. PATENT DOCUMENTS

| | | | |
|---|---|---|---|
| 5,048,099 | 9/1991 | Lee | 382/9 |
| 5,161,213 | 11/1992 | Knowlton | 395/128 |
| 5,325,447 | 6/1994 | Vogt, III | 382/22 |
| 5,335,290 | 8/1994 | Cullen et al. | 382/9 |

FOREIGN PATENT DOCUMENTS 2513780  4/1983  France .............................. G06K 9/20

OTHER PUBLICATIONS

IBM Systems Journal, vol.29, No. 3, 1 Jan. 1990, pp. 435–450, XP 000265375, Casey R G et al "Intelligent Forms Processing", Section Registration, see p. 441–p. 442; figures 5–7.

Primary Examiner—Jose L. Couso
Assistant Examiner—Matthew C. Bella
Attorney, Agent, or Firm—Ronald J. Paglierani

[57] ABSTRACT

A document processing system (10) includes a user interface (22, 24, 25) and a memory (18) for storing bitmap data (18a) representing a document (14) that includes text. The user interface includes a display (22, 22a) for visualizing an image of the bitmap data and an input device, such as a mouse (25), for specifying locations within the displayed image corresponding to locations within the stored bitmap data. The document processing system further includes a bitmap data processor (20) that is responsive to a first specified location designating a start of an area of the image containing text to a second specified location designating a termination of the area of the image containing text, for processing bitmap data corresponding to the area. The bitmap processor operates to determine a lateral extent of lines of text within the area, to determine an amount of slope, if any, of the lines of text within the area, to determine a center-to-center spacing of the lines of text within the area, and to determine a location of a top line of the text. That is, the bitmap processor operates to refine the boundary of the area specified by the input device so as to provide a geometric specification of all text appearing within the bitmap data that corresponds to the originally specified area. The bitmap processor preferably operates to first laterally compress the bitmap data prior to operating on same.

20 Claims, 6 Drawing Sheets

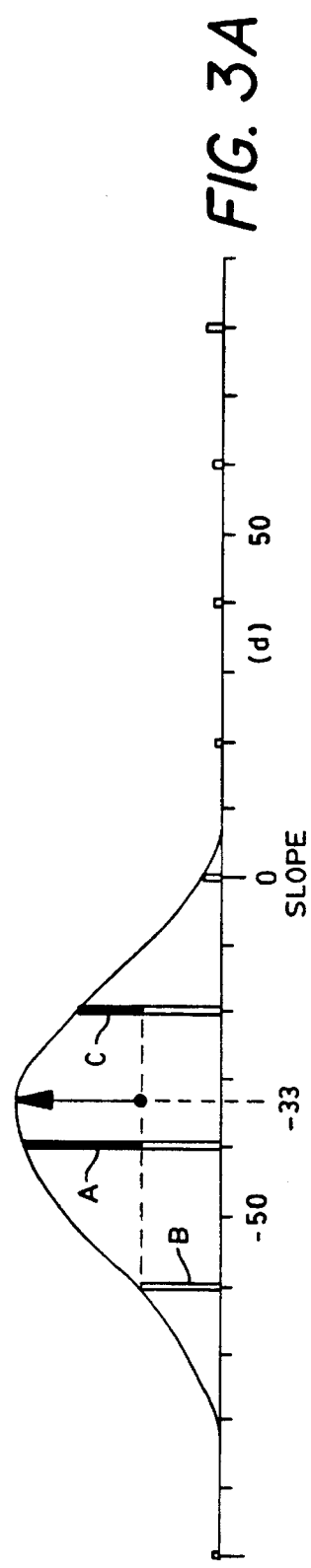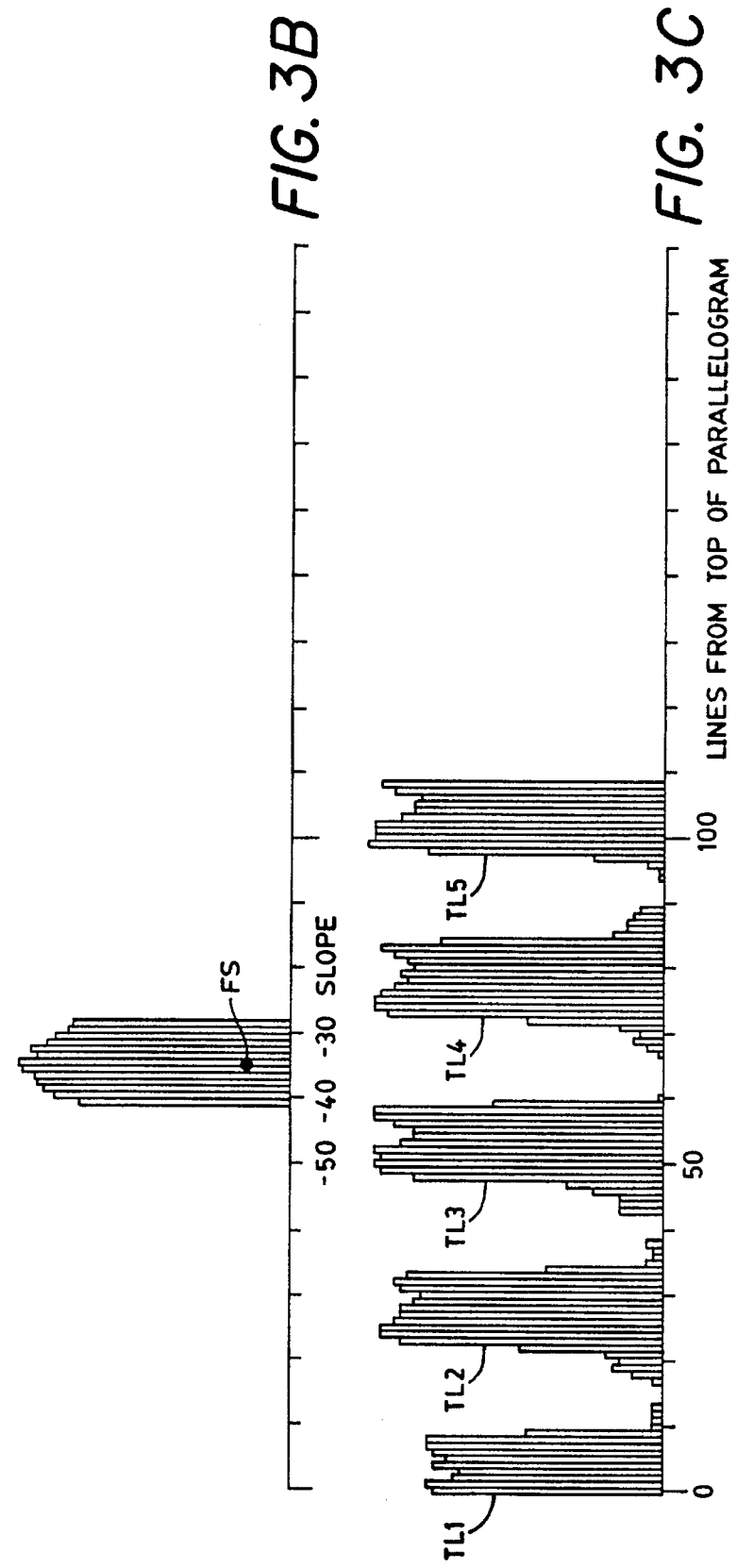

METHOD AND APPARATUS FOR AUTOMATICALLY SPECIFYING A PORTION OF TEXT FROM A BITMAP IMAGE OF THE TEXT

FIELD OF THE INVENTION

This invention relates generally to document processing systems and, in particular, to a document processing system that includes an optical scanner for inputting data representative of information appearing on a page of a document.

BACKGROUND OF THE INVENTION

One well known technique to enter one or more pages of a document into a document processing system employs a document imaging system, such as an optical scanner, to sense differences in optical density that occur on a surface of a page. The differences in optical density are converted to binary information (pixels) at a predetermined or selected resolution, such as 200 dots per inch (dpi), and are output in a scanline format. The document image data can be displayed to a user of the system. The image data may also be subsequently compressed, and/or it may be further processed to identify an informational content of the scanned image. Optical character recognition (OCR) is one well-known processing technique that is used to convert groups of image pixels to codes that correspond to alphanumeric characters.

A user of a document imaging system often finds it desirable to select a portion of text from a scanned binary bitmap image of the text. The selected portion can then be processed to perform, by example, OCR, de-skewing, cut-and-paste, redaction and/or other such processes. A most convenient interaction, from the user's point of view, would be to identify the desired processing operation and to then simply point with, by example, keyboard arrow keys, a mouse, or a trackball, to the starting and ending points of the selected text portion in the display of the bitmap image.

In response to the user's input, it would also be desirable to invoke a program to refine the user's approximate geometric specification of the implied portion of the bitmap, thus determining the leftward and rightward extents of the implied portion and also the period and phase of lines of text within the implied portion, in addition to a slope (deviation from exactly horizontal) of the bitmap image. That is, the task of the program would be to perform a five-dimensional search through combinations of possible values of these five parameters, within an interactively acceptable time period, yielding the refined geometric specification of the selected portion of the bitmap image. The refined geometric specification could then be passed to another routine, such as a cut-and-paste routine, which would then accurately locate the desired portion of the text in the bitmap image to perform the desired operation.

Heretofore there has not existed a document processing system capable of executing a sequence of automated operations for performing such a five-dimensional search, at an interactively acceptable speed, and for outputting a refined geometric specification.

OBJECTS OF THE INVENTION

It is thus an object of this invention to provide a method for performing an automated sequence of operations refining an approximate geometric specification of a specified portion of a bitmap text image.

It is another object of this invention to provide a document processing system that includes a user interface and one or more processors capable of executing an automated sequence of operations for refining a user-indicated geometric specification of a portion of a bitmap text image within a larger bitmap text image, the processor(s) operating in response to the user indicating a start and a termination of the portion of the bitmap text image.

SUMMARY OF THE INVENTION

The foregoing and other problems are overcome and the objects of the invention are realized by a document processing system, and by a method for operating the document processing system, in accordance with the teaching of this invention.

The document processing system includes a user interface and a memory for storing bitmap data representing a document that includes text. The user interface includes a display for visualizing an image of the bitmap data and an input device, such as a mouse, for specifying locations within the displayed image corresponding to locations within the stored bitmap data.

In accordance with the invention the document processing system further includes a bitmap data processor that is responsive to a first specified location designating a start of an area of the image containing text to a second specified location designating a termination of the area of the image containing text, for processing bitmap data corresponding to the area. The bitmap processor operates to determine a lateral extent of lines of text within the area, to determine an amount of slope, if any, of the lines of text within the area, to determine a periodicity of the lines of text within the area, and to determine a location of a top line of the text. That is, the bitmap processor operates to refine the boundary of the area specified by the input device so as to provide a geometric specification of all text appearing within the bitmap data that corresponds to the originally specified area. The refined geometric specification may be subsequently passed to a utility that performs, by example, OCR, cut-and-paste, and/or redaction on the text image. The bitmap processor preferably operates to first laterally compress the bitmap data prior to determining the lateral extent, the slope, the periodicity, and the location of the top line of the text.

BRIEF DESCRIPTION OF THE DRAWINGS

The above set forth and other features of the invention are made more apparent in the ensuing Detailed Description of the Invention when read in conjunction with the attached Drawings, wherein:

FIGS. 2A–2C depict an exemplary binary bitmap image (FIG. 2C being a laterally compressed version of the image of FIG. 2A) that are useful in describing the operation of the method and apparatus of this invention; FIGS. 3A–3C are histograms that correspond to the binary bitmap images shown in FIGS. 2A–2C, the histograms of FIGS. 3A and 3B being employed during a slope determination procedure that is a feature of the method of this invention, while the histogram of FIG. 3C is employed during a period and phase determination procedure;

DETAILED DESCRIPTION OF THE INVENTION

Figure 1:
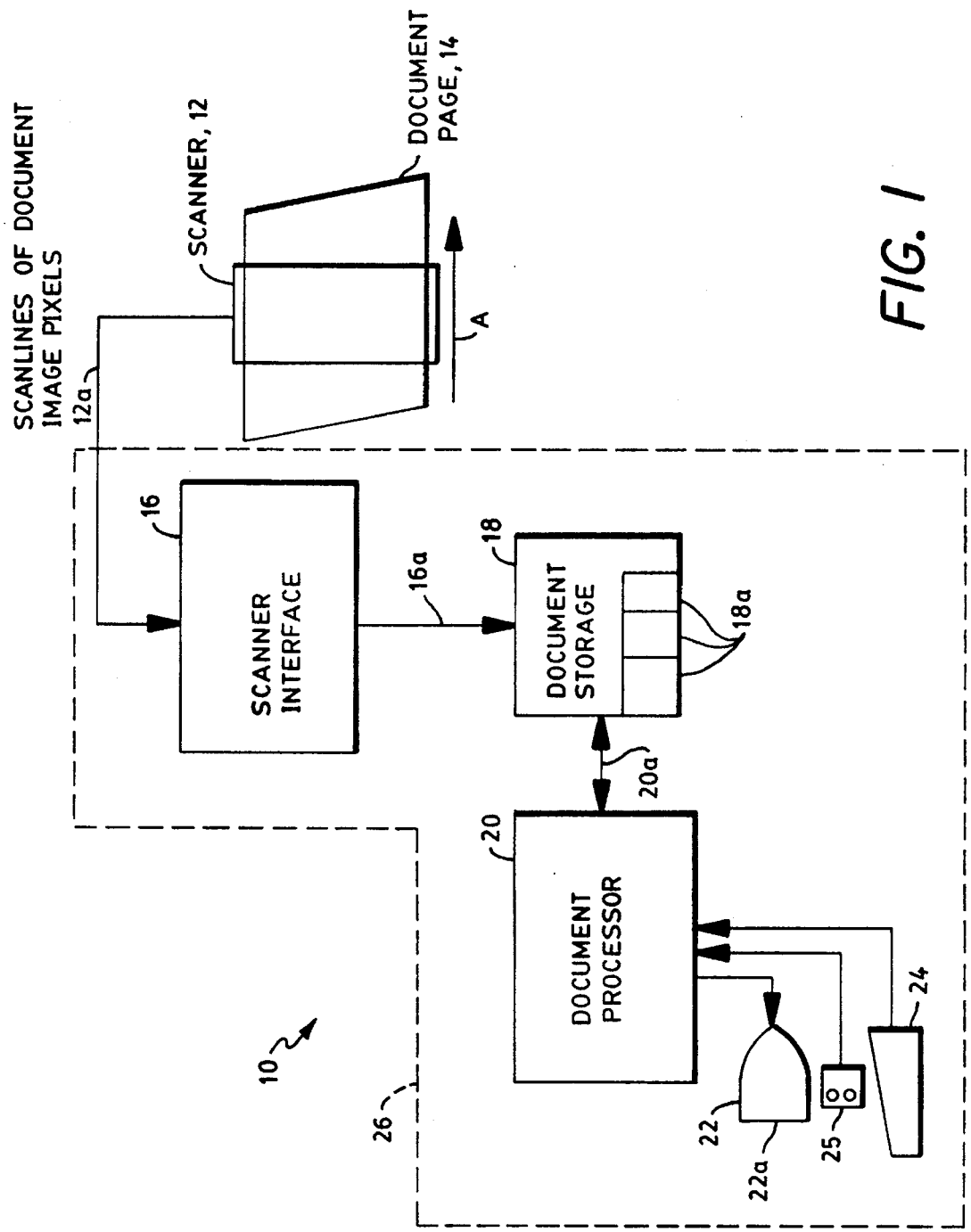
FIG. 1 is a block diagram of a document processing system coupled with a document imaging system that are suitable for use in practicing this invention.

FIG. 1 illustrates a document processing system 10 that is constructed and operated in accordance with this invention. A conventional document scanner 12 is employed to detect an optical contrast resulting from printed text and graphical images that appear on a surface of a scanned document page 14. For some types of scanners a relative motion between the scanner 12 and the page 14 causes the scanner 12 to output on signal line(s) 12a a sequence of binary ones and zeros that are indicative of the optical contrast that is sensed by the scanner. For other types of scanners, such as CCD cameras, there need be no relative motion between the page and the scanner.

By example, a binary one indicates the presence of a dark area on the page 14 (a portion of a character or a graphical image), while a binary zero indicates an absence of a dark area (the background or "whitespace"). As employed herein the binary ones and zeros are each referred to as a pixel. The binary information is output in a scanline format, wherein a scanline is oriented perpendicularly to the scan direction (indicated by the arrow A). As such, a single scanline will typically include pixels from portions of characters. As an example, and assuming the resolution of the scanner 12 is 200 dpi and that the page 14 is 8.5 inches wide, a scanline can comprise up to 1700 discrete pixels (8.5×200). Typical scanner resolutions are in the range of 100 dots (or pixels) per inch (along the scanline) to 400 dpi.

Coupled to the signal line(s) 12a, and hence to the output of the scanner 12, is a scanner interface 16. An output of the scanner interface 16 is coupled via a bus 16a to a document storage module 18. Storage module 18 may be embodied within semiconductor memory, magnetic or optical disk memory, magnetic or optical tape, or any form suitable for storing the digitized document page data. As shown, the storage module 18 has three stored document page images represented as bitmap page data blocks 18a.

Accessing of the document storage 18 and display of the pages is controlled by a document processor 20. This processor is bidirectionally coupled to the document storage module 18 via bus 20a, and is also coupled to conventional user interface devices such as a CRT display 22, keyboard 24 and an optional pointing device, such as a mouse 25. The CRT display 22 has a display screen 22a which has graphical capabilities to enable the display of the 2-dimensional arrays (bitmap document page image) of pixels that are output by the scanner 12. The document processor 20 may have word processing and editing capabilities, although for a document archiving application these capabilities may not be required or desirable.

It should be realized that the components 16–24 may all be incorporated within a single data processor 26, such as a personal computer. In this case, the scanner interface 16 may be a software module that is invoked to process the output of the scanner 12, which may be coupled to a parallel or a serial port of the data processor 26 in a conventional manner. Also in this case, the buses 16a and 20a may be the same system bus, whereby the scanner interface software and the document processor software are interfaced to the main memory and mass storage components of the data processor 26. In a further embodiment of this invention the scanner 12 can be made an integral component of the data processor 26.

As such, it should be understood that the embodiment of the document processing system 10 of FIG. 1 is intended to be viewed as an exemplary embodiment of this invention, and is in no way intended to be viewed as a limitation upon the practice of this invention.

Figures 2A, 2B:
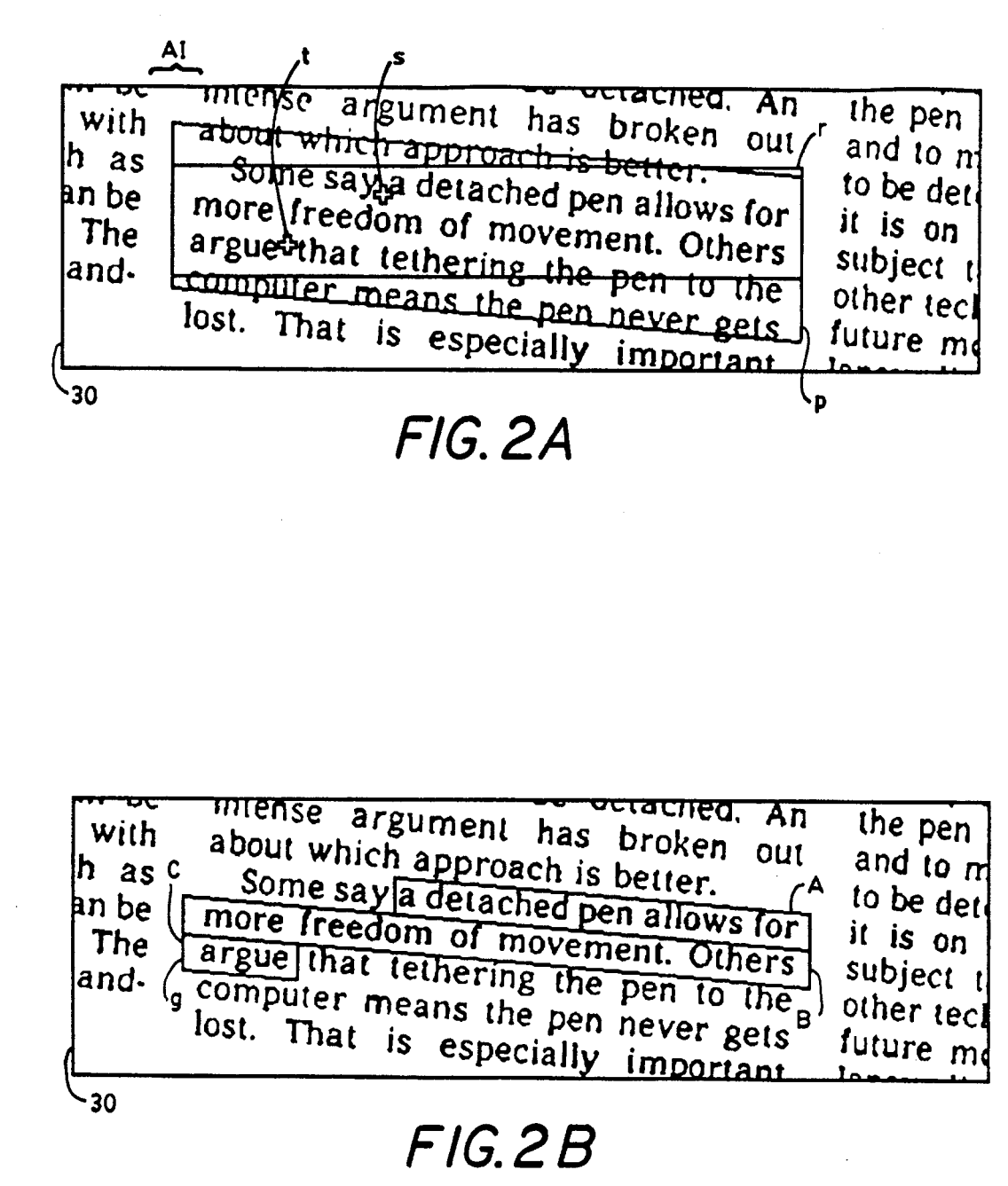
Figure 2C:
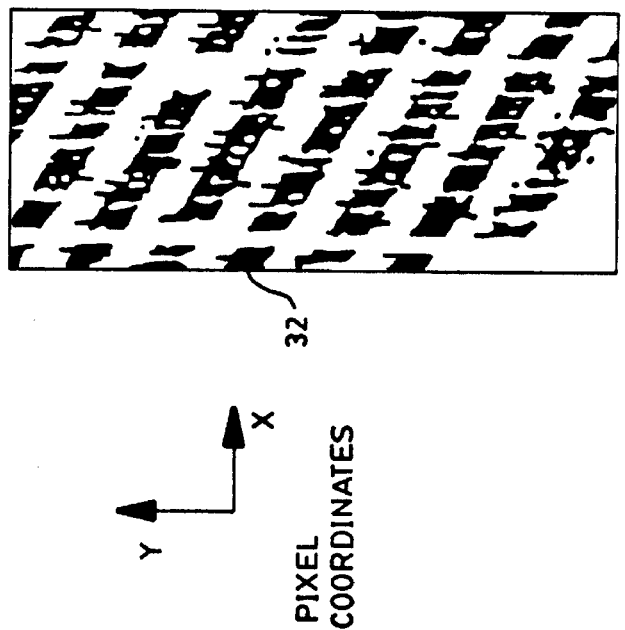

Reference is now made to FIGS. 2A–2C. A scanned binary bitmap image of a document page typically arises with no logical or geometric information about the text that is contained within the bitmap image. In general, not even the slope of text lines (most probably intended to be horizontal) may be assumed if precise operations such as redaction are to be performed on the binary bitmap image.

As illustrated in FIGS. 2A and 2B, this invention provides a mechanism for a user to point and click (assuming the use of the mouse 25) at a starting point s and a terminating point t in the exemplary binary bitmap image 30 of FIG. 2A. In response to this initial geometric specification of a portion of the binary bitmap image 30 the document processor 20 examines the bitmap image and delineates the geometric "answer" g of FIG. 2B, i.e., a set of parallelograms which cover completely and only the intervening text image between s and t. As such, the initial geometric specification is refined and can be made available to one or more programs or utilities that are capable of operating on the specified portion of the bitmap image.

One definition of the task that must be executed by the document processor 20 is that of a search which yields the best set of values for the following five parameters:

1) the leftward extent of the text image (to aisle or page margin, where an aisle is designated as AI in FIG. 2A);
2) the rightward extent of the text image (to aisle or page margin);
3) the slope of the text image (i.e., the deviation in pixels from horizontal, across the indicated extent);
4) the period of the text image (i.e., the center-to-center spacing of textlines); and
5) the phase of the text image (i.e., the location of the top of the top text line).

It would be computationally expensive and time consuming to test exhaustively all combinations of these five values. Instead, the method of this invention establishes values for these five parameters essentially in the order listed, except that the period and phase are determined simultaneously.

It is first noted that various precisions are required for the five parameters. With respect to parameters one and two, and since the left and right extents of the text image are defined by blank space (either page margins or aisles between columns), pixel precision is not necessary and, in fact, values to the nearest byte (eight pixels) are sufficient. With respect to parameters three and five, and since subsequent operations typically operate, at the finest resolution, with complete pixels, the slope and phase need be specified only to the nearest whole pixel. With respect to parameter four, the line-to-line period is preferably determined more accurately in order that roundoff errors do not accumulate as successive lines of text are delineated. As such, the method of this invention generates a best estimate of the line-to-line period with a result expressed in tenths of pixels.

It should be realized that these various resolutions reflect those arrived at for a presently preferred embodiment of this invention, and are in no way to be construed in a limiting sense upon the practice of this invention.

With reference to the various portions of the text bitmap image of FIGS. 2A–2B, the following determinations are described in detail below: lateral extent, slope, and period/phase. These determinations are based on an underlying bitmap of the page image. This bitmap need not have the same resolution as the bitmap displayed to the user on the screen 22a of FIG. 1. However, since the slope from horizontal is typically small, and because the lateral extent need not be determined very precisely (to within one byte or eight pixels), a bit-per-byte map has been found to be sufficient. Such an eight times (8:1) laterally compressed version of the bitmap image of FIG. 2A is illustrated in FIG. 2C. FIG. 2C is illustrated in an enlarged fashion, it being realized that the vertical dimension and, hence, the number of lines of pixels are equal to that of FIG. 2A. In the laterally compressed image 32 of FIG. 2C each displayed pixel represents a byte of the original bitmap image that contains, by example, two or more foreground pixels (i.e., a byte containing at least two logic one bits). Operating with such a bit-per-byte laterally compressed image has been found to significantly decrease the high-speed storage requirements which, for large high-resolution images, might otherwise be excessive.

Figure 4:
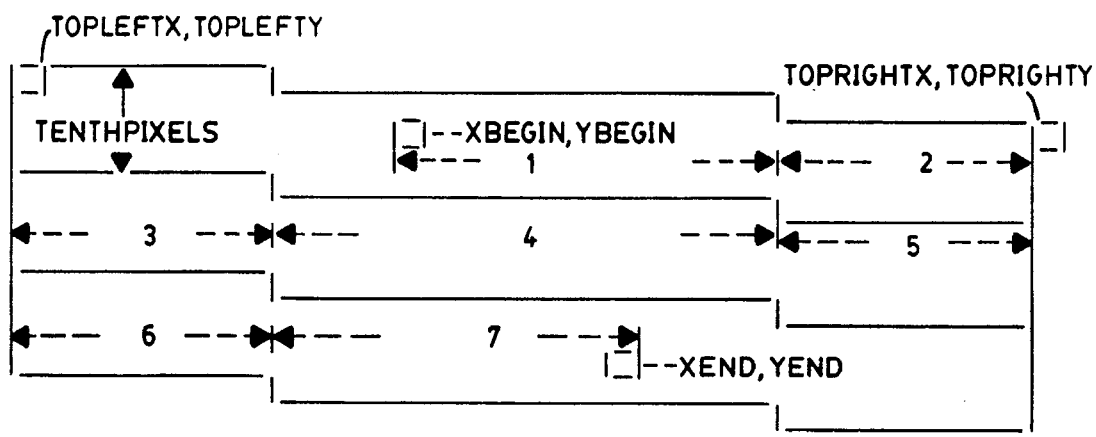
FIG. 4 is a diagram that illustrates various document image conventions that are employed by the invention.

Referring to FIG. 4, the operation of the method of this invention may be expressed as follows:

given the user supplied coordinates (xbegin,ybegin) and (xend, yend);

determine (topleftx, toplefty), (toprightx, toprighty) and tenthpixels.

Optionally the method may provide a breakdown of the delineated area within the original image into rectangles, such as those numbered 1 through 7 (or, alternately, into parallelograms). In the example illustrated in FIG. 4 the "slope" is −2 pixels across the extent of the text. That is, the point designated by (toprightx, toprighty) is two pixels or scanlines "lower" than the point designated by (topleftx, toplefty). If the slope were instead positive then the converse would be true, that is, the point designated by (toprightx, toprighty) would be two pixels or scanlines "higher" than the point designated by (topleftx,toplefty). For a zero slope the point designated by (topleftx, toplefty) and the point designated by (toprightx,toprighty) would both lie on the same scanline.

For greater positive or negative slopes there are correspondingly more resulting rectangles. The slightly sloping lines with one-pixel steps are equivalent to well-known Bresenham lines, i.e., the best lines on a binary bitmap for approximating a straight line between given endpoints.

Figure 9:
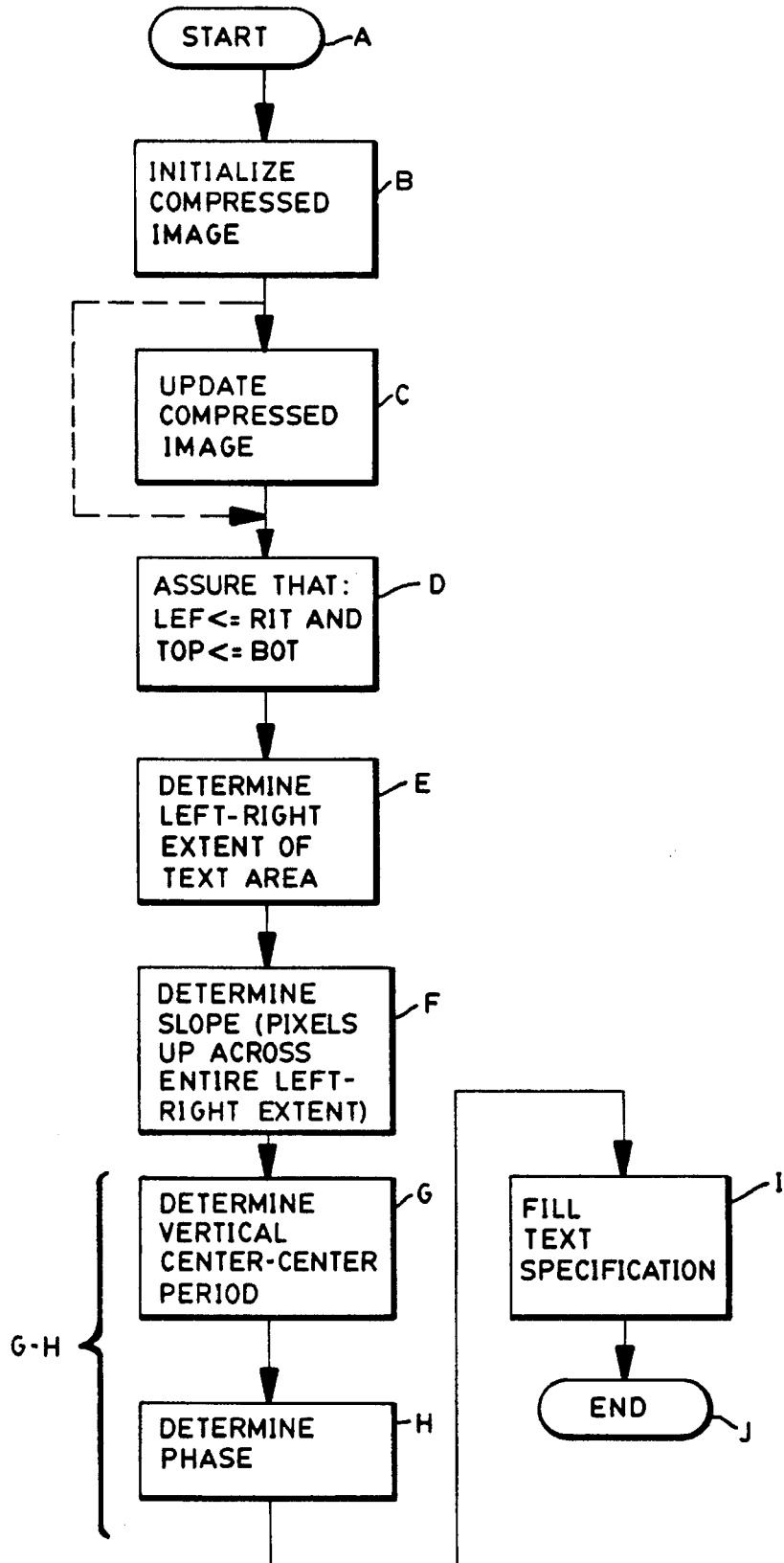
FIG. 9 is a logic flow diagram that illustrates the steps executed by the method of this invention.

A detailed description of the various steps of the method of this invention is now presented in conjunction with the logic flow diagram of FIG. 9.

At Block A the method is invoked in response to the user designating the starting and terminal points in the displayed bitmap image (the points designated s and t in FIG. 2A). This is the initial, approximate geometric specification of an area of interest within the bitmap image that is being displayed to the user on screen 22a.

At Block B the compressed image (FIG. 2c) is made. The compressed image need only be made once, at the beginning of the interactive session (or even earlier); and it serves then for all subsequent requests for text specification, so long as it can be fitted into high speed memory. Otherwise the compressed image is updated only so far as necessary if and when some needed portion of it is not already resident in high speed memory. In this case the desired portion can either be recomputed by reading in the additionally needed part of the uncompressed image, or the appropriate part of the already compressed image is read in (presumably from hard disk). Commonly used computers have sufficient high speed memory (RAM) to hold a complete 8x compressed image of an 8.5"×11" page, binary-scanned at traditional 200 or 300 dpi resolutions. Block C indicates this compressed image update procedure which may or may not be required for a given instance of the execution of the method.

At Block D a determination is made to ensure that the user-designated points s and t are within the compressed bitmap image.

At Block E a determination is made of the left-right (lateral) extent of the indicated area of text within the bitmap image. In this regard the user-indicated points s and t (FIG. 2A) only approximate the vertical extent of the region of interest; i.e., the results will be definitely wrong only if either is so high or low that it appears to be in an adjacent text line.

During the execution of Block E an initial rectangle r is defined so as to include the defining points s and t and a predetermined number of image lines above and below. This rectangle is stretched horizontally until sufficiently wide vertical swaths of "blank bytes" are found on its right and left edges, where a blank byte is a zero bit in the compressed pixel-per-byte map which represents an original byte having fewer than two foreground pixels.

If the text image slopes excessively the aisles between columns of text will also tilt. Consequently, the term "sufficiently wide blank swath" is defined to be one column of clear blank bytes each of which is part of a horizontal string of three consecutive blank bytes. This definition applies specifically to 200 dpi images. For other resolutions these values are scaled accordingly.

Figure 5:
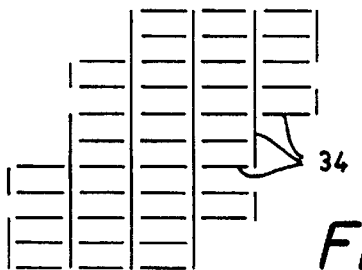
FIG. 5 depicts an exemplary arrangement of rectangles that represent blank bytes, this Figure being useful in explaining a method of fixing a left or a right edge of a rectangle during a determination of a lateral extent of a bitmap image.

For the 200 dpi case the repeating patterns of three blank bytes 34 shown in FIG. 5 is sufficient to fix the left or right edge of the initial rectangle.

Having thus determined the lateral extent of the user-designated text area, the method continues to Block F to determine the slope. In this regard, and if the slope of the text were known a priori, then it would be expected that samples of the image spaced along a sampling line at the same slope would tend to be either blank or largely occupied, depending on whether the sampling line passed through a line of text or through the space between two adjacent lines of text. Also, if two parallel sampling lines are used to sample the compressed text image a fixed distance apart, and if the two parallel sampling lines are oriented at the actual slope of the text, it should be expected that, frequently, one sampling line would be found to sample blank pixels and the other to sample occupied pixels.

Figure 6:
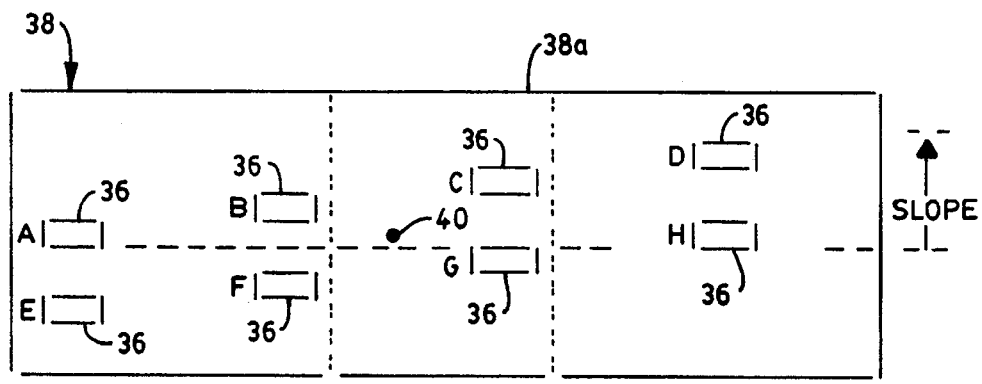
FIG. 6 is an exemplary arrangement of byte samples that represent predetermined pattern templates, this Figure being useful in explaining a method of slope determination.

Based on the foregoing assumptions Block F operates in accordance with a technique that, for every slope, a count or tally is made of the number of times that certain patterns are found within the initial rectangle 38. These patterns or templates are illustrated in FIG. 6, wherein samples 36 designated as a,b,c,d are horizontally spaced one-quarter of the width of the initial rectangle 38, along a line of a certain slope, and those samples 36 that are designated as e,f,g,h are a fixed number of pixels (e.g., eight) below a,b,c,d, respectively. The pattern of samples 36 is iteratively positioned so that the center 40 of the pattern is successively located at all positions in the centrally disposed quarter 38a of the rectangle 38. For each slope, a tally is incremented for each set of samples that satisfies the following criterion which is suggestive of this being indeed the slope of the text:

CRITERION:

a,b,c,d are all blank and either two or three of e,f,g are occupied; or e,f,g,h are all blank and either two or three of a,b,c are occupied.

As expressed immediately above, the sampling of the compressed image would result in an unacceptably large, nested iteration. As such, it is preferred to execute Block F by first performing a sampling of slopes and, from the sample, estimating the true text slope. In the locality of the estimate a more complete and careful search is made in accordance with the following sub-steps of the method step indicated as Block F of FIG. 9.

Sub-step A: For every twentieth possible slope value, and for only one half of the sampling positions implied in the previously set forth criterion, the sub-step generates a histogram that indicates the likelihood of the text slope being of approximately the selected slope value. FIG. 3A illustrates such a histogram for the exemplary case of FIG. 2A.

Sub-step B: From the resulting tallies of the histogram the method selects the tally having the greatest value, and also its two neighbors, and an estimate is made of the location of a maximum of a smooth curve that passes through these points. One relatively simple method to accomplish this is to use the center of gravity of those parts of the two highest tallies that exceed the least of the three. This technique gives the center value if the two neighbors are equal; gives a half-way between value if there are equal adjacent maxima, etc. In FIG. 3A the vertical bar designated A is the tally of greatest value, and the bars designated B and C are the two nearest neighbors. To estimate the maximum of the presumed smooth curve, the parts of A and C below the level of B are ignored and the center of gravity of the remaining parts of A and C (shown shaded) is computed, yielding in the example an estimated slope of −33.

Sub-Step C: Based on the estimated slope, the involved area of the image is adjusted slightly. That is, the area is better approximated by the parallelogram p illustrated in FIG. 2A. Rather than being centered on the center of the previous rectangle, the parallelogram p is arranged so that its top and bottom are equally distant from the original x-y image coordinates that specify points s and t. That is, in defining the vertical position of the parallelogram p a compensation is made for the horizontal location of the defining points s and t, in accordance with the estimated slope.

In the example of FIG. 2a the estimated slope was found to be negative, approximately −33, and the defining points s and t are both left of center. Therefore the parallelogram p is centered slightly lower than the previous initial rectangle 38.

Sub-step D: A more complete and accurate search for the best slope is now made in the vicinity of the estimated slope of FIG. 3A, starting with the estimated slope and proceeding both up (towards more positive slopes) and down (towards more negative slopes), and always selecting next the unmeasured slope adjacent to that end of the examined range having the higher tally. Referring now also to FIG. 3B, in each measurement the spatial iteration uses every position rather than every other position. The range of slopes tallied increases until (a) at least a certain number, for example 13, of values are measured and (b) tallies at each end of the examined range are below the value for the first examined slope. A histogram of such tallies is shown in FIG. 3B. The final determined slope of the text image (i.e., the rise in pixels across the horizontal span of text) is taken as the center of gravity of this set of values after all tally values are diminished by the minimum value of the set. This final, refined slope value is designated as FS in FIG. 3B.

Having thus determined the slope of the user-designated text image area, the method continues to Blocks G and H of FIG. 9 to determine the period and the phase, respectively. Blocks G and H, in a presently preferred embodiment of this invention, are executed in parallel as a doubly nested iteration. Thus, these two blocks are also indicated in FIG. 9 as the single block G-H.

These steps require the use of the slope determined in Block F. It will be useful to recall that the period of the text image has been defined to be the center-to-center spacing of textlines, and that the phase of the text image has been defined to be the distance of the top of the top text line from the top of parallelogram p.

The nature of the determined slope has the following intuitive meaning, which is best explained by analogy. If one were located in the plane of the image looking through the text from left to right, and supposing that the background is clear and the text is translucent, the determined slope would correspond to the optimum viewing angle which would differentiate light that would be seen between the lines of text from the shadowed patches that would be seen if attempting to look lengthwise through lines of text.

Keeping this analogy in mind, and with the rectangle r of FIG. 2A now readjusted as the parallelogram p to reflect more accurately the slope of the text as just determined, Block G-H operates to examine the area of the parallelogram p at every level. For each level the method tabulates the number of non-blank bytes on the Bresenham line defined by the current level and by the determined slope. That is, a determination is made of a projection of the non-blank byte population at the determined slope. The result is another histogram, as illustrated in FIG. 3C, that clearly indicates five areas populated with foreground pixels. These five populated areas are indicative of the five lines of text (TL1–TL5), from top to bottom, that occur within the parallelogram p in FIG. 2A. What remains is to define geometrically the regular arrangement of these five text lines.

Figure 8:
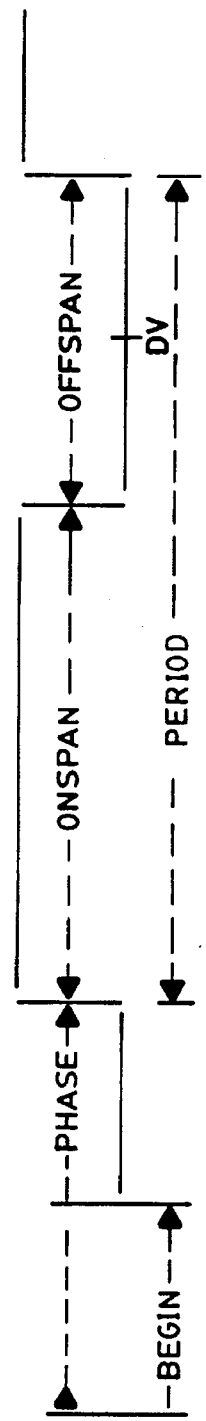
FIG. 8 is a diagram utilized when explaining a method of determining the phase and the period of a selected portion of the bitmap image.

The text line period and phase are taken from a best square wave fit (see also FIG. 8) to the histogram of FIG. 3C. To accomplish the best square wave fit all values of the histogram of FIG. 3C are preferably diminished by one-eight of the maximum value, but not to less than zero. Then a period and a duty cycle (percentage "on") of square waves are chosen which maximizes a difference between the average of the "on" values (onspan) and the average of the "off" values (offspan). Finally, the precise dividing line (DV) between one text line's area and the next is taken to be the exact center of the 'offspan' part of the cycle.

The determination of the best period (i.e., number of vertically adjacent pixels per text line) is generally insufficient because, by roundoff alone, the period value may be in error by up to one half pixel. This half pixel error per line of text will tend to accumulate if many lines of text are thus to be delineated. Therefore, a more accurate result is obtained by using the two adjacent values in the vicinity of the best period and by interpolating to determine an estimated intermediate value in exactly the same manner as the intermediate best estimate of slope was determined from three measured values. The resulting period value is reported with a resolution expressed in tenths of pixels per text line.

Having thus determined the period and phase, the method proceeds to Block I of FIG. 9 to fill or delineate the determined text portion of the compressed bitmap image. The determined values (leftward extent, rightward extent, slope, period and phase) are referenced to the user's original x-y pixel coordinate system. These values are then made available to another routine or utility that is intended to operate on the text image. By example, an OCR routine may operate to identify the character codes that correspond to the pixel values within the area g of FIG. 2B. The OCR routine operates on the original (non-compressed) bitmap image.

An example of the operation of another utility, redaction, is now given.

The redaction utility is used to blank out or otherwise visually obscure a specified portion of the text image. For example, the delineated area g in FIG. 2B would appear blacked out, at least in exported versions of the image, with lines of redacted text either being separated by white lines or not. A separate utility provides a 'read through' display in which the redacted area may, for example, be shown in reverse video. The use of the 'read through' display utility may be controlled so as to permit only certain users to view text in a redacted area.

Figure 7:
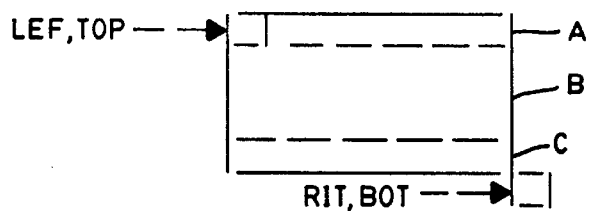
FIG. 7 is a diagram useful in illustrating a part of a redaction operation.

Referring to FIG. 7, if the calling program requests an enumeration of the rectangles comprising the area to be redacted (67 such rectangles are implied in the area g of FIG. 2B, corresponding to the many one-pixel steps in the sloping lines), the various procedures described below may be applied, rectangle by rectangle. In FIG. 7 the A indicates that the area may be painted white or black (one pixel high); the B indicates that the area may be painted black, or displayed with reverse video; and C indicates that the area may be painted white or black (one pixel high).

If the calling program instead performs its own geometric computations then it must, of course, truncate the top parallelogram on the left and the bottom one on the right, as illustrated in FIG. 2B, in accordance with the lateral positions of the original defining points.

The method of this invention can be modified in several ways to suit the requirements of a particular environment or application. By example, and as was mentioned above, for resolutions other than 200 dpi the various constants representing geometric distances are appropriately rescaled. Rescaling can also be accomplished for situations in which variations in text size are expected. Also by example, for greyscale images a predetermined threshold greyscale value can be employed to establish the binary values used to produce the compressed bit-per-byte map. Further by example, for color images a brightness value can be derived from the three color components of a pixel which, by comparison with a predetermined brightness threshold, results in a binary value to be used for image compression.

It should also be realized that the logic flow diagram of FIG. 9 can be viewed as a block diagram of an image processing system having a plurality of serially connected functional blocks, such as dedicated processors, each executing the indicated function upon the compressed text image data 32 of FIG. 2C. In this case at least the Blocks C to G-H may be coupled to a memory (e.g., semiconductor, disk or tape) that stores the bit-per-byte compressed image.

It should further be realized that the method of this invention is not restricted for use with a system that receives a document image from a conventional document scanner per se, but may be employed for processing any bitmap text image. Examples include, but are not limited to, a bitmap text image that is received from a facsimile device, and a bitmap text image that is generated by a data processor for transmission to a facsimile device.

Thus, while the invention has been particularly shown and described with respect to a preferred embodiment thereof, it will be understood by those skilled in the art that changes in form and details may be made therein without departing from the scope and spirit of the invention.

What is claimed is:

1. A document processing system, comprising:

memory means for storing bitmap data representing a document that includes lines of text;

user interface means including means for displaying an image of the bitmap data and means, responsive to input from a user, for specifying locations within the displayed image corresponding to locations within the stored bitmap data; and means, responsive to a first specified location designating a start of an area of the image containing lines of text, and responsive to a second specified location designating a termination of the area of the image containing lines of text, for processing a subset of the bitmap data corresponding to the area to determine from the subset of the bitmap data a lateral extent of the lines of text within the area, to determine from the subset of the bitmap data an amount of slope of the lines of text within the area, to determine from the subset of the bitmap data and from the determined amount of slope a center-to-center spacing of the lines of text within the area, and to determine from the subset of the bitmap data and from the determined amount of slope a location of a top line of the text.

2. A system as set forth in claim 1, wherein said processing means includes means for laterally compressing the bitmap data prior to said processing means determining said lateral extent, said slope, said spacing, and said location from the subset of the bitmap data.

3. A method for execution by a document processing system for processing bitmap data comprised of lines of pixel data representing a document that contains lines of text, comprising the steps of:

displaying an image of the bitmap data, the image including a text image portion comprised of lines of text;

in response to a user specifying a starting point and a terminating point of a region within the text image portion that includes lines of text, accessing a working copy of the bitmap data with a first bitmap data processor and determining with the first bitmap data processor a lateral extent of the lines of text extend from the starting point to the terminating within the region;

accessing the working copy of the bitmap data with a second bitmap processor and determining with the second bitmap data processor an amount of slope of the lines of text within the region;

accessing the working copy of the bitmap data with a third bitmap processor and determining with the third bitmap data processor, in accordance with the determined amount of slope, a center-to-center period of the lines of text extend from the starting point to the terminating within the region; and accessing the working copy of the bitmap data with a fourth bitmap processor and determining with the fourth bitmap data processor, in accordance with the determined amount of slope, a location of a top of a top line of text of the lines of text within the region.

4. A method as set forth in claim 3 wherein the step of accessing the working copy of the bitmap data with a first bitmap data processor and determining a lateral extent includes an initial step of generating the working copy of the bitmap data by performing a step of uniformly laterally compressing the bitmap data.

5. A method as set forth in claim 4 wherein the step of compressing compresses the bitmap data with an 8:1 pixel compression ratio.

6. A method as set forth in claim 3 wherein said step of accessing the working copy of the bitmap data with the first bitmap data processor and determining a lateral extent includes a preliminary step of defining a rectangle that includes the specified starting and terminating points and also a predetermined number of lines of pixels both above and below the specified starting and terminating points.

7. A method for execution by a document processing system for processing bitmap data comprised of lines of pixel data representing a document that contains lines of text, comprising the steps of:

displaying an image of the bitmap data, the image including a text image portion comprised of lines of text;

in response to a user specifying a starting point and a terminating point of a region within the text image portion that includes lines of text, accessing a working copy of the bitmap data with a first bitmap data processor and determining with the first bitmap data processor a lateral extent of the lines of text within the region;

accessing the working copy of the bitmap data with a second bitmap processor and determining with the second bitmap data processor an amount of slope of the lines of text within the region;

accessing the working copy of the bitmap data with a third bitmap processor and determining with the third bitmap data processor, in accordance with the determined amount of slope a center-to-center period of the lines of text within the region; and accessing the working copy of the bitmap data with a fourth bitmap processor and determining with the fourth bitmap data processor, in accordance with the determined amount of slope, a location of a top of a top line of text of the lines of text within the region;

wherein said step of accessing the working copy of the bitmap data with the first bitmap data processor and determining a lateral extent includes a preliminary step of defining a rectangle that includes the specified starting and terminating points and also a predetermined number of lines of pixels both above and below the specified starting and terminating points; and wherein said step of accessing the working copy of the bitmap data with the second bitmap processor and determining an amount of slope includes the steps of:

applying a plurality of pattern templates at a plurality of positions within the defined rectangle to selectively sample pixel values within the rectangle;

estimating a slope value based on the sampled pixel values;

constructing at least one histogram by iteratively sampling a plurality of slope values in the vicinity of the estimated slope value; and refining the estimated slope value based on the constructed at least one histogram.

8. A method as set forth in claim 7 and further including a step of replacing the defined rectangle with a parallelogram having internal angles that are determined based on the refined estimated slope value.

9. A method as set forth in claim 8 wherein the steps of accessing the working copy of the bitmap data with the third bitmap processor and determining the spacing and accessing the working copy of the bitmap data with the third bitmap processor and determining the location both are accomplished by fitting a square wave function to a projection, at the refined estimated slope value, of non-blank pixels in the parallelogram, wherein the spacing is a function of a period of the square wave function and wherein the location is a function of a phase of the square wave function.

10. A method as set forth in claim 9 and including a step of constructing the projection by the steps of generating a histogram by examining lines of pixels along the refined estimated slope value and counting occurrences of non-blank pixels within the examined lines.

11. A method as set forth in claim 8, and including a further step of outputting coordinates of the parallelogram.

12. A method as set forth in claim 9 where a best fitting squarewave to the histogram is one which maximizes a difference between an average of on-phase histogram values and an average of off-phase histogram values.

13. A document processing system, comprising:

a device for generating bitmap data comprised of rows of pixels representing a document page;

a display for displaying an image of the bitmap data, the image including at least one portion that is comprised of lines of characters;

input means for specifying a starting point and an ending point of a region within the image portion that includes lines of characters;

a data compressor for compressing the bitmap data only along the rows of pixels for generating and storing a laterally compressed version of the bitmap data;

a first bitmap data processor coupled to the stored laterally compressed version of the bitmap data for determining, with a first precision, lateral extents of the lines of characters within the region;

a second bitmap data processor coupled to the stored laterally compressed version of the bitmap data for determining, with a second precision, a slope of the lines of characters within the region;

a third bitmap data processor coupled to the stored laterally compressed version of the bitmap data, and responsive to the slope determined by the second bitmap data processor, for determining, with a third precision, a center-to-center spacing between the lines of characters within the region; and a fourth bitmap data processor coupled to the stored laterally compressed version of the bitmap data, and responsive to the slope determined by the second bitmap data processor, for determining, with a fourth precision, a location of a top of a top-most line of characters within the region.

14. A document processing system as set forth in claim 13 wherein said first bitmap data processor includes means for defining a rectangle that includes the specified starting and ending points and also a predetermined number of rows of pixels both above and below the specified starting and ending points.

15. A document processing system, comprising:

a device for generating bitmap data comprised of rows of pixels representing a document page;

a display for displaying an image of the bitmap data, the image including at least one portion that is comprised of lines of characters;

input means for specifying a starting point and an ending point of a region within the image portion that includes lines of characters;

a data compressor for compressing the bitmap data only along the rows of pixels for generating and storing a laterally compressed version of the bitmap data;

a first bitmap data processor coupled to the stored laterally compressed version of the bitmap data for determining, with a first precision, lateral extents of the lines of characters within the region;

a second bitmap data processor coupled to the stored laterally compressed version of the bitmap data for determining, with a second precision, a slope of the lines of characters within the region;

a third bitmap data processor coupled to the stored laterally compressed version of the bitmap data, and responsive to the slope determined by the second bitmap data processor, for determining, with a third precision, a center-to-center spacing between the lines of characters within the region; and a fourth bitmap data processor coupled to the stored laterally compressed version of the bitmap data, and responsive to the slope determined by the second bitmap data processor, for determining, with a fourth precision, a location of a top of a top-most line of characters within the region;

wherein said first bitmap data processor includes means for defining a rectangle that includes the specified starting and ending points and also a predetermined number of rows of pixels both above and below the specified starting and ending points; and wherein said second bitmap data processor includes means for applying a plurality of pixel templates at a plurality of positions within the defined rectangle to selectively sample values of compressed pixels within the rectangle; means for estimating a slope value based on the sampled values; means for constructing at least one histogram by iteratively sampling compressed pixel values at a plurality of slope values in the vicinity of the estimated slope value; and means for refining the estimated slope value based on the constructed at least one histogram.

16. A document processing system as set forth in claim 15 wherein said second bitmap data processor further includes means for replacing the defined rectangle with a parallelogram having corner angles that are determined based on the refined estimated slope value.

17. A document processing system as set forth in claim 16 wherein said third bitmap data processor further includes means for fitting a square wave function to a projection, at the refined estimated slope value, of non-blank pixels within the parallelogram, wherein the center-to-center spacing between the lines of characters is determined from a period of a best-fit square wave function.

18. A document processing system as set forth in claim 16 wherein said fourth bitmap data processor further includes means for fitting a square wave function to a projection, at the refined estimated slope value, of non-blank pixels within the parallelogram, and wherein the location of the top of a top-most line of characters within the region is a function of a phase of a best-fit square wave function.

19. A document processing system as set forth in claim 13 wherein said device includes one of a document scanner and a facsimile machine.

20. A document processing system as set forth in claim 13 wherein said first precision is a multi-pixel precision, wherein said second precision and said fourth precision are each a single-pixel precision, and wherein said third precision is a fractional-pixel precision.

* * * * *